United States Patent
King et al.

(10) Patent No.: US 7,298,321 B2
(45) Date of Patent: Nov. 20, 2007

(54) SATELLITE POSITIONING SYSTEM RECEIVERS AND METHODS

(75) Inventors: Thomas M. King, Tempe, AZ (US); George J. Geier, Scottsdale, AZ (US); Mark Heng, Scottsdale, AZ (US); Robert Harbour, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/225,440

(22) Filed: Sep. 13, 2005

(65) Prior Publication Data

US 2006/0181453 A1    Aug. 17, 2006

Related U.S. Application Data

(62) Division of application No. 10/606,555, filed on Jun. 26, 2003, now abandoned.

(51) Int. Cl.
*G01S 5/14* (2006.01)
*H04B 1/16* (2006.01)

(52) U.S. Cl. ............... 342/357.12; 455/343.4

(58) Field of Classification Search ............ 342/357.12
See application file for complete search history.

(56) References Cited

U.S. PATENT DOCUMENTS

| | | | |
|---|---|---|---|
| 4,449,248 A * | 5/1984 | Leslie et al. ............... 340/7.36 |
| 4,704,735 A * | 11/1987 | Swapp et al. ............... 455/68 |
| 5,430,657 A | 7/1995 | Kyrtsos |
| 5,448,773 A | 9/1995 | McBurney et al. |
| 5,678,174 A * | 10/1997 | Tayloe ........................ 455/13.1 |
| 5,731,786 A | 3/1998 | Abraham et al. |
| 5,764,184 A | 6/1998 | Hatch et al. |
| 5,786,773 A | 7/1998 | Murphy |
| 5,799,256 A * | 8/1998 | Pombo et al. ............... 455/574 |
| 5,841,396 A | 11/1998 | Krasner |
| 5,874,914 A | 2/1999 | Krasner |
| 5,999,125 A | 12/1999 | Kurby |
| 6,016,117 A | 1/2000 | Nelson, Jr. |
| 6,057,800 A | 5/2000 | Yang et al. |
| 6,058,338 A | 5/2000 | Agashe et al. |
| 6,064,336 A | 5/2000 | Krasner |
| 6,112,054 A * | 8/2000 | Kita .......................... 455/12.1 |
| 6,118,977 A | 9/2000 | Vannucci |
| 6,134,483 A | 10/2000 | Vayanos et al. |
| 6,157,896 A * | 12/2000 | Castles et al. ................ 702/95 |
| 6,208,290 B1 | 3/2001 | Krasner |
| 6,211,817 B1 | 4/2001 | Eschenbach |
| 6,211,819 B1 | 4/2001 | King et al. |
| 6,225,945 B1 | 5/2001 | Loomis |
| 6,229,478 B1 | 5/2001 | Biacs et al. |
| 6,275,185 B1 | 8/2001 | Loomis |
| 6,313,787 B1 | 11/2001 | King et al. |
| 6,373,429 B1 | 4/2002 | Eschenbach |
| 6,392,593 B1 * | 5/2002 | Pemble .................. 342/357.15 |

(Continued)

*Primary Examiner*—Gregory C. Issing
(74) *Attorney, Agent, or Firm*—Roland K. Bowler, II

(57) ABSTRACT

A satellite positioning system receiver programmed to operate synchronously with an expected time of arrival of information from at least one satellite of a satellite positioning system, and to receive the information from the at least one satellite when the receiver is operating during the expected time of arrival of the information. In one embodiment, the receiver operates synchronously with an expected arrival of specific subframe information from at least one satellite of a satellite positioning system, and receives the specific subframe information when the receiver is operating.

7 Claims, 10 Drawing Sheets

U.S. PATENT DOCUMENTS

| | | |
|---|---|---|
| 6,400,314 B1 | 6/2002 | Krasner |
| 6,421,002 B2 | 7/2002 | Krasner |
| 6,424,890 B1 | 7/2002 | Syrjarinne et al. |
| 6,437,735 B1 | 8/2002 | McMahan |
| 6,438,382 B1 | 8/2002 | Boesch et al. |
| 6,567,712 B1 | 5/2003 | Rog et al. |
| 6,571,111 B1 * | 5/2003 | Mayo et al. ............... 455/574 |
| 6,651,000 B2 | 11/2003 | Van Diggelen et al. |
| 2002/0149516 A1 | 10/2002 | Vayanos et al. |
| 2003/0023379 A1 | 1/2003 | Diggelen et al. |
| 2004/0252053 A1 * | 12/2004 | Harvey ............... 342/357.15 |

* cited by examiner

SATELLITE POSITIONING SYSTEM RECEIVERS AND METHODS

CROSS REFERENCE TO RELATED APPLICATIONS

The present application is a division of and commonly assigned U.S. application Ser. No. 10/606,555 filed on 26 Jun. 2003 now abandoned, from which benefits under 35 USC 120 are hereby claimed and the contents of which are incorporated herein by reference.

FIELD OF THE DISCLOSURE

The present disclosure relates generally to satellite positioning system (SPS) receivers, and more particularly to acquiring satellite information used for approximating the initial position of and locating SPS receivers, for example, Global Positioning System (GPS) enabled mobile wireless communications subscriber devices, and methods.

BACKGROUND

The Global Positioning System (GPS) is a satellite based location and time transfer system developed by the United States government and available free of charge to all users. Other satellite positioning systems (SPS) have also been or are being developed, including the Glonass satellite system in Russia and the Galileo system in Europe.

The location of an SPS receiver is based upon a one-way ranging between the SPS receiver and several satellites, which transmit signals having the times-of-transmission and orbital parameters for their respective time variable locations-in-space. An SPS receiver acquires satellite signals by correlating internal replica signals to carrier frequencies and distinguishable codes for each of several in-view satellites. When satellite signals have been acquired, the SPS receiver uses time and the orbital parameter information from the acquired satellites for measuring ranges to the satellites, preferably four or more satellites. These measured ranges are called pseudoranges because they include a term caused by a time error of the SPS receiver clock.

The SPS satellite pseudoranges are measured by determining phase offsets between pseudorandom (PRN) codes of the received satellite signals and the internal replica PRN codes referenced to the SPS receiver clock. Some SPS receivers measure and integrate the carrier phases of the satellite signals in order to reduce noise on the measured phase offsets. The SPS receiver then determines an SPS-based time by monitoring the SPS signals until a TOW field is decoded. The SPS-based time is used to determine the times that the phase offsets were measured. The measurement times are then used with ephemeris data received from the satellites for calculating instantaneous locations-in-space of several satellites and for linearizing location equations relating the calculated locations-in-space to the measured pseudoranges. Having four or more linearized location equations for four or more satellites, respectively, SPS receivers can resolve their 3-dimensional geographical location and correct the time error in their internal clocks.

It is known generally to use almanac and ephemeris information stored on SPS receivers to speed the acquisition of satellites. The almanac data contains coefficients to Kepler's equations of satellite motion and is useful for computing which satellites are visible at a particular time. The almanac data may also be used for computing satellite location and velocity vectors, from which satellite Doppler estimates may be computed for aiding signal acquisition. The almanac data provides low-resolution satellite position accuracy, which is typically no better than about 1 kilometer when fresh. Almanac data however contains a relatively small number of bytes, approximately 1200 bytes for 32 satellites, and almanac data is useful for 6 months to 1 year depending on whether satellites are re-positioned or new satellites have been added or removed from the constellation. In the GPS constellation, each satellite broadcasts almanac data, which is updated every few days, for all GPS satellites on a twelve and one-half minute cycle.

Ephemeris data is similar to almanac data but provides far more accurate satellite position information, which is accurate to within several meters if the ephemeris data is not more than a few hours old. The accuracy of satellite position information derived from ephemeris data degrades with time. SPS receivers typically use ephemeris data for computing precise satellite locations, which may be used for position computation when combined with SPS receiver measured pseudorange information. A GPS constellation ephemeris data set for one satellite is approximately 72 bytes of data, and thus ephemeris data for all 32 GPS satellites requires about 2304 bytes of data storage space. In the GPS constellation, each satellite broadcasts its own ephemeris data every thirty-seconds. An SPS receiver must acquire a satellite in order to obtain its ephemeris data.

In a typical GPS receiver, for example, in GPS enabled cellular communications and stand-alone navigation devices, the time to acquire new almanac data directly from a satellite requires more than twelve and a half minutes (12.5 minutes). Operating GPS receivers for the relatively long period required to obtain almanac data directly from a satellite draws substantially charge from the battery, which is undesirable in many applications including GPS enabled cellular telephones. The time required to obtain ephemeris data in this manner is comparatively small, at approximately thirty seconds (30 sec.).

It is known to provide almanac information to GPS enabled radio communications devices in an over-the-air radio message, as disclosed, for example, in U.S. Pat. No. 6,064,336 entitled "GPS Receiver Utilizing A Communication Link", among other patents and publications. In some instances, however, it is undesirable to use almanac information or to obtain it in an over-the-air message.

It is also known to provide ephemeris information to GPS enabled radio communications devices in an over-the-air radio message, as performed, for example, by the Motorola Eagle GPS receivers. In prior art FIG. 1, GPS satellite ephemeris and almanac information 10 is transmitted from a cellular communications network base-station 12 to a wireless subscriber device 14 using an over-the-air communications protocol. Wireless subscriber device 14 contains a GPS receiver 16 with an antenna, a cellular transceiver 20, and two databases, stored in memory, to store ephemeris data 22 and almanac data 24. The GPS receiver 16 can acquire both almanac and ephemeris data directly from GPS satellites via antenna 18 and store them into the almanac database 24 and ephemeris database 22. In addition, the cellular transceiver 20 can acquire fresh almanac and ephemeris data 10 from the cellular network via over-the-air messages.

Transmitting satellite almanac and ephemeris data over a communications link however requires costly network infrastructure. Additionally, relatively long data strings are required for the transmission of ephemeris and almanac data, and the management of requesting and storing the data derived from over-the-air messages is cumbersome. Other GPS receiver applications, including vehicle navigation, do not include a radio, which could be used for receiving over-the-air assistance messages. For these and other reasons, in at least some applications, it is undesirable to obtain almanac data from over-the-air assistance messages.

U.S. Pat. No. 6,437,735 entitled "Position Detection System Integrated into Mobile Terminal" discloses receiving ephemeris data at a mobile GPS receiver either directly from GPS satellites or from a wireless communications network, and transforms the ephemeris data to almanac information by scaling and masking ephemeris parameters to form corresponding almanac parameters, which are stored on the GPS receiver for positioning determination. Almanac data derived in this manner is believed have substantial errors, for example, accumulated error in the along-track direction, which will likely produce unacceptable results over very long time periods.

The various aspects, features and advantages of the disclosure will become more fully apparent to those having ordinary skill in the art upon careful consideration of the following Detailed Description thereof with the accompanying drawings described below.

DETAILED DESCRIPTION

According to one aspect of the disclosure, a satellite positioning system (SPS) receiver automatically acquires or attempts to acquire almanac data any time the SPS receiver is connected to external power, for example, to a battery charger or a car-kit adaptor. In this mode of operation, the SPS receiver continuously operates the GPS receiver to demodulate almanac data or other information, for example, from signals received directly from a satellite or from some other source, while connected to the external power supply.

Figure 1:
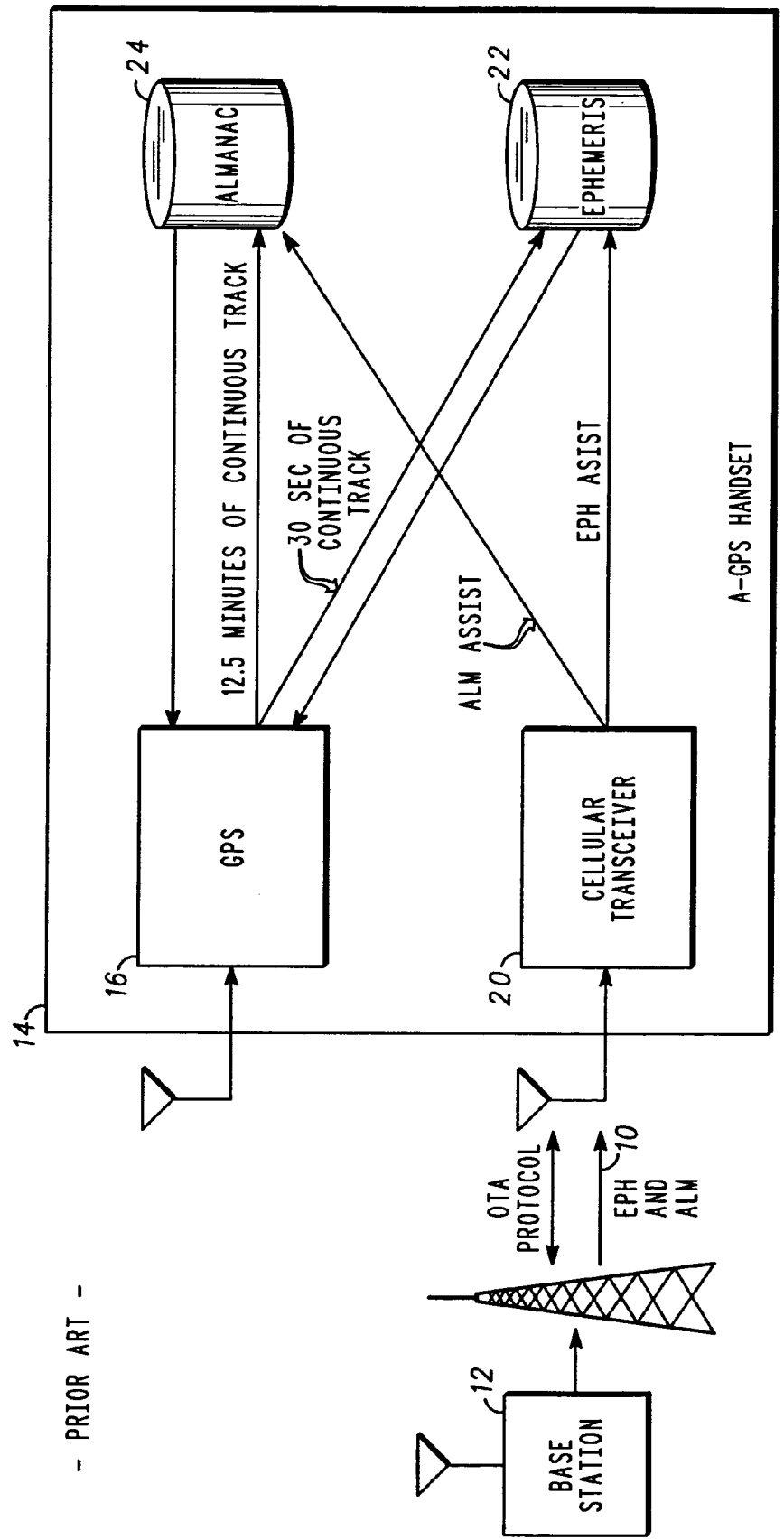
FIG. 1 is prior art system architecture for communicating GPS satellite almanac and ephemeris information from networks to subscriber devices.
Figure 2:
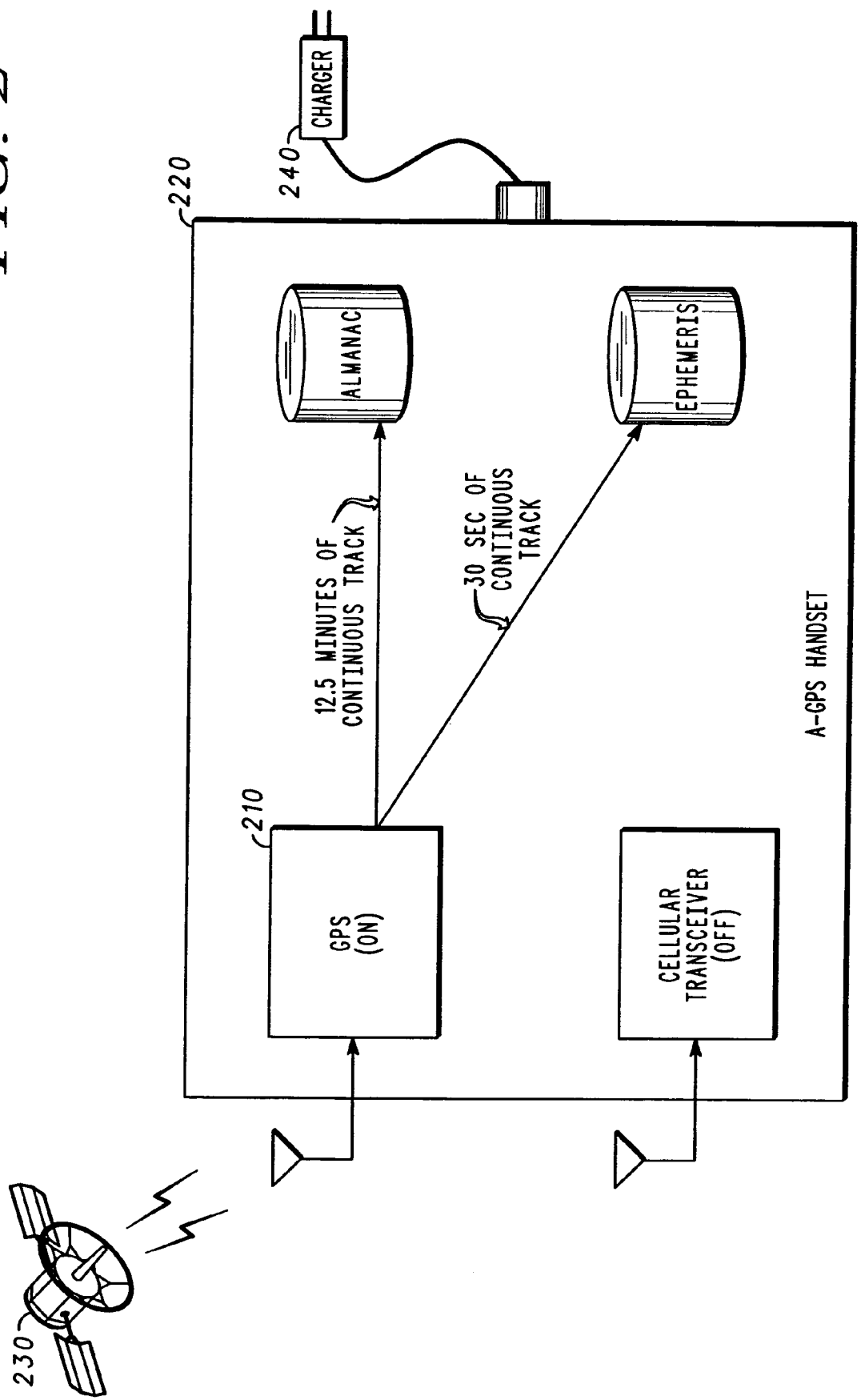
FIG. 2 is a schematic block diagram of an exemplary GPS receiver.

In FIG. 2, a GPS receiver 210 in a cellular handset 220 acquires satellite navigation data directly from a GPS satellite 230 via GPS antenna 232. Once received, the satellite navigation data, for example, almanac and/or ephemeris data, is stored in memory, for example, in ephemeris database 234 and almanac database 236. The GPS receiver 210 is continuously powered ON and attempting to demodulate ephemeris and almanac data directly from GPS satellites 230 as long as power is applied to the handset externally via an external charger connector 240. The external power may be from a battery charger, a cigarette lighter adapter, a hands-free car adaptor, or similar external power supply that supplies power to the entire phone instead of from the batteries internal to the SPS receiver.

Figure 3:
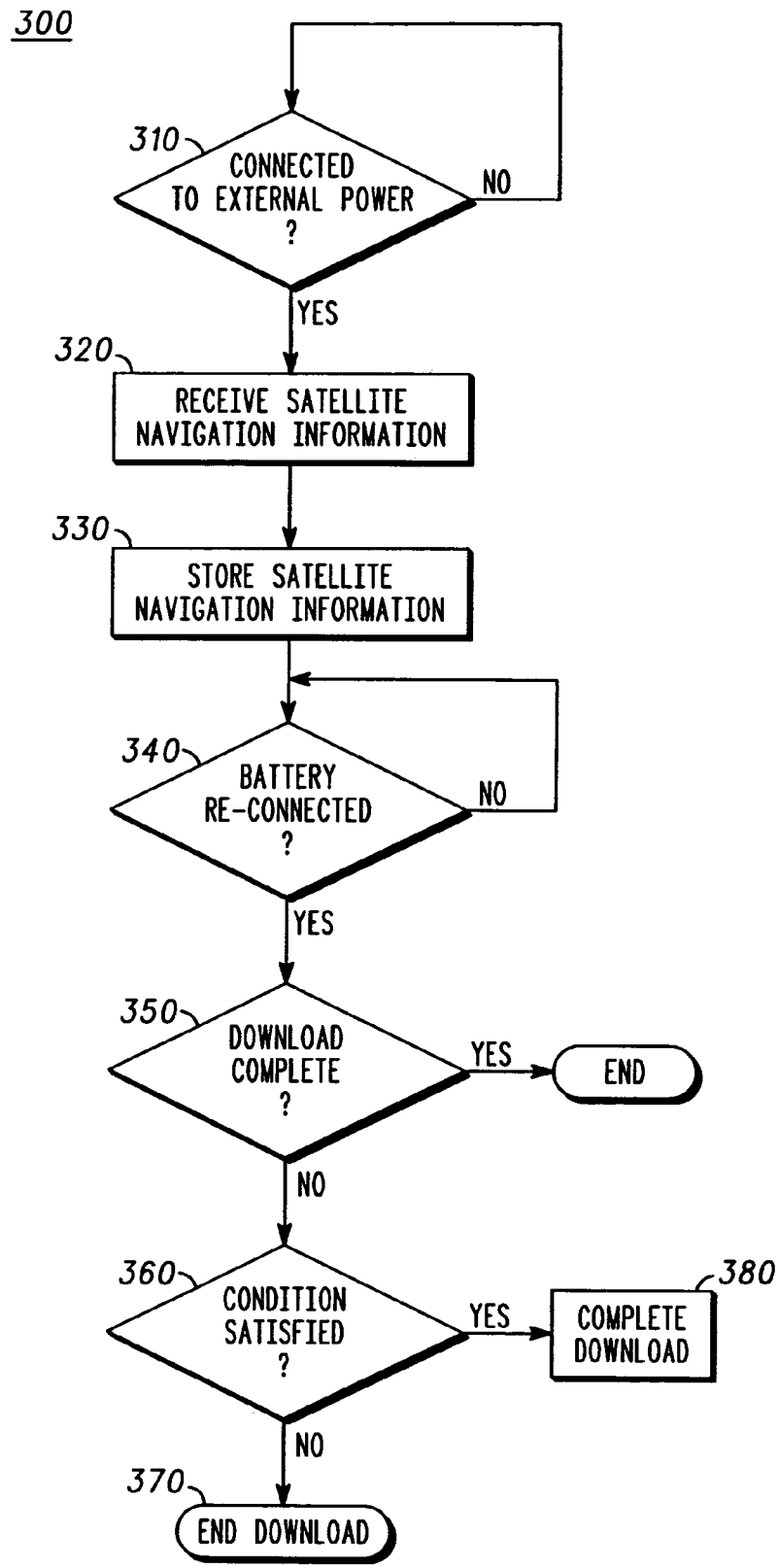
FIG. 3 is a process flow diagram.

In the process diagram 300 of FIG. 3, at block 310, a determination is made whether the SPS receiver, for example, embedded in a cellular subscriber device, is connected to a power supply other than its internal battery. At block 320, satellite navigation information is received if the receiver is coupled to the external power supply. The satellite information, for example, ephemeris and/or almanac data, may be received directly from a satellite or alternatively from some other source without regard to battery power consumption since the receiver does not operate on battery power. At block 330, the satellite navigation information is stored on the receiver, for example, in memory.

In one embodiment, reception of satellite positioning system navigation data begins when the receiver is connected to a power supply other than its battery. Generally, the reception of satellite positioning system navigation data is discontinued if the receiver is reconnected to its battery. In some embodiments, however, it may be desirable to continue reception of the SPS navigation data upon reconnecting the SPS receiver to its battery until reception of the navigation data is complete. In some embodiment, navigation data, for example almanac data, is downloaded directly from the satellite only if the receiver is coupled to external power.

In FIG. 3, at block 340, a determination is made whether battery power has been re-connected, for example, upon disconnecting the external power source. If the download of satellite data is incomplete at block 350, a determination is made at block 360 whether a condition is satisfied that would require or justify completion of the download under battery power. The condition assessed at block 360 may be that the downloading data is essential or that the download is nearly complete, which may be determined, for example, by assessing whether a predetermined portion, or percentage, of the navigation data has already been received. In FIG. 3, at block 370, the download is ended if the condition is not satisfied, and at block 380 the download is completed if the condition is satisfied.

Figure 4:
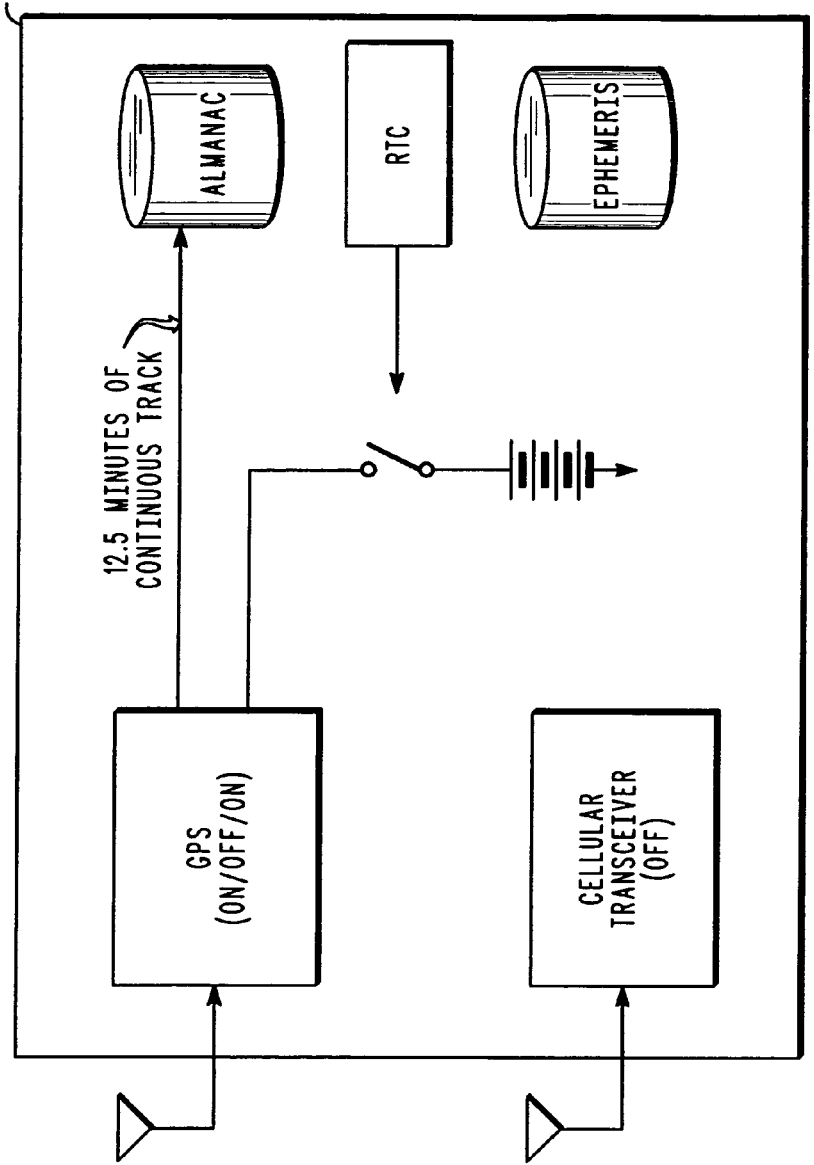
FIG. 4 is another schematic block diagram of an exemplary GPS receiver.

According to another aspect of the disclosure, an SPS receiver is operated synchronously with an expected time of arrival of information, for example, satellite almanac and/or ephemeris information. Thus operated, the SPS receiver does not remain idle and consume power when not receiving information. FIG. 4 illustrates a schematic block diagram of an exemplary SPS receiver having a real-time clock that controls operation of the GPS receiver synchronously with expected arrival times of information.

Figure 5:
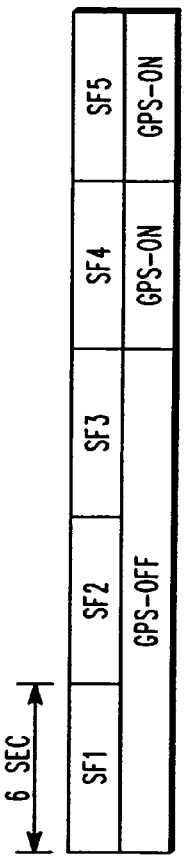
FIG. 5 is an exemplary signal having information frames.

FIG. 5 is an exemplary multi-frame signal, for example, a GPS navigation message, although the message could be any other signal. GPS signals are transmitted on predictable schedules, and thus upon acquiring a GPS signal, the GPS receiver may synchronize its operation to receive only information of interest in the signal. In FIG. 5, for example, the receive function of the GPS receiver is powered OFF during the arrival of frames SF1-SF3, and the receive function of the GPS receiver is power ON during the arrival of frames SF4 and SF5 to permit reception and demodulation of the desired data almanac. The almanac data is known to occupy only sub frames 4 and 5, and not occupy subframes 1 through 3. The almanac data is commutated over 25 sequential sets of subframes 4 and 5 in order to broadcast the almanac data. The data structure shown in FIG. 5 begins synchronously with every 30-second epoch from the start of the week. Thus, the time of the $1^{st}$ bit of subframe 1 is always transmitted some integer number times 30 seconds since the beginning of the week (n*30 sec). Likewise, the $1^{st}$ bit of subframe 2 is known to begin 6 seconds later, or at time T=n*30+6 seconds, since the start of the week. Subframe 3 begins at T=n*30+12 seconds, subframe 4 begins at T=n*30+18 seconds, and subframe 5 begins at T=n*30+24 seconds since the beginning of the week. Consequently, if the GPS receiver real-time clock is previously synchronized with relatively accurate time, it can be programmed to power on at the beginning of subframe 4 and power-off at the end of subframe 5, demodulating only bits for those subframes, and acquiring fresh almanac data while minimizing its power consumption. 25 sets of subframes 4 and 5 are required to obtain a complete issue of almanac data. In one embodiment, the GPS receiver receives navigation information while tracking a satellite.

In one embodiment, the GPS receiver is operated synchronously with an expected arrival of ephemeris and/or almanac information in a GPS navigation message transmitted by a GPS satellite or other source, like a repeater. In other embodiments, the GPS receiver operates synchronously with an expected time of arrival of clock correction information, ionospheric correction information, tropospheric correction information, universal time coordinate offset correction information, or other having a scheduled time of arrival.

Generally, the GPS receiver may perform other operations during time periods when the receive function disabled, for example, during the arrival of frames SF1-SF3 in FIG. 5. More particularly, during periods when the GPS receiver is not receiving, the GPS receiver may operate to process signals received previously.

Navstar document ICD-GPS-200, Revision C, updated Oct. 11, 1999, which is hereby incorporated by reference in its entirety, list on pp. 87 and 96 the ephemeris parameters and on page 108 the almanac parameters.

Satellite almanac data is useful in computing acquisition assistance information, such as satellite Doppler and code phase estimates and satellite visibility estimates as a function of time. The almanac data is tailored or optimized for a particular epoch time. The epoch time is identified by a parameter TOA (time of almanac), which is the epoch time described as the number of seconds into the week, and an almanac week number WNA. The GPS time clock and week numbers began at week number zero and time zero on Jan. 5, 1980, week numbers increment one count each week, rolling over after 1024 weeks, while the GPS time clock increments one second each second, clearing at the start of the next week. 604800 seconds are accumulated each week. An almanac week number WNA and TOA identify precisely the reference time for the almanac with an ambiguity of the 256-week period of the almanac week number. The almanac week number is 8 bits of the 10 bit GPS week number producing a 256 week repeat time. The almanac equations for determining satellite position vs. time are driven by a time difference, that being the time in seconds between the current time and the TOA, accounting for week number differences as well. A notation for how this is accomplished with almanac is shown in Eqn. (1), in which a function translates the almanac into a 3 dimensional satellite XYZ position vector in the earth-centered-earth-fixed (ECEF) coordinate frame as a function of time "t", week number "wk", for a particular satellite "sv", and where the function SVPOS_alm uses the almanac satellite position equations described earlier.

$$SVPosXYZ\_alm[sv]=SVPOS\_alm(t, wk, sv) \quad (1)$$

The 3-dimensional vector SatPosXYZ_alm can be written as SVPosXYZ_alm=[SVPosX, SVPosY, SVPosZ], where the SVPosX component is the X-axis element, SVPosY is the Y-axis element, and SVPosZ is the Z-axis element. The almanac equations translate time and week number into satellite velocity vector as shown below in Eqn. (2).

$$SVVelXYZ\_alm[sv]=SVVEL\_alm(t, wk, sv) \quad (2)$$

The returned velocity vector is a 3-dimensional vector in the ECEF Cartesian coordinate system indicating the satellite velocity at the instantaneous time epoch "t".

The satellite ephemeris data is also targeted and optimized for a particular epoch time, called time of ephemeris, or TOE. The ephemeris data is useful for computing precise satellite position data accurate to within a few meters, provided the time difference between the current time "t" and TOE is within +/-2 hours under normal conditions. When the difference between time t and TOE is within the range -7200 seconds<=t-TOE<=+7200 seconds, the ephemeris data reliably computes the satellite position vector and velocity vector data to a precision necessary for user position and velocity computation. When time is outside the range -7200 seconds<=t-TOE<=+7200 seconds, the satellite position accuracy is degraded and ephemeris data is not generally useful for autonomous position solutions.

Similar to almanac data, aged or inaccurate ephemeris data is useful for computing acquisition assistance information, such as Doppler and code phase estimates and satellite visibility estimates as a function of time. The larger the time difference t-TOE the larger the error in satellite position and velocity coordinates. Equations describing ephemeris developed position and velocity data are shown below in Eqns. (3) & (4).

$$SVPosXYZ\_eph[sv]=SVPOS\_eph(t, wk, sv) \quad (3)$$

$$SVVelXYZ\_eph[sv]=SVVEL\_eph(t, wk, sv) \quad (4)$$

The satellite position and velocity equations used are as described in ICD-GPS-200 document, Table 20-IV.

In one embodiment, the satellite position derived from ephemeris data is compared to that derived from almanac data, for the same satellite and at the same time "t". For example, the 3-dimensional difference vector represented below by Eqn. (5)

$$\Delta PXYZ[sv]=|SVPOS\_eph(t, wk, sv)-SVPOS\_alm(t, wk, sv)| \quad (5)$$

represents the linear range difference between the almanac-derived position and ephemeris-derived position, where the magnitude operator |.| is a shortcut notation for the square root of the sum of the squares of each of the three vector difference elements.

Figure 8:
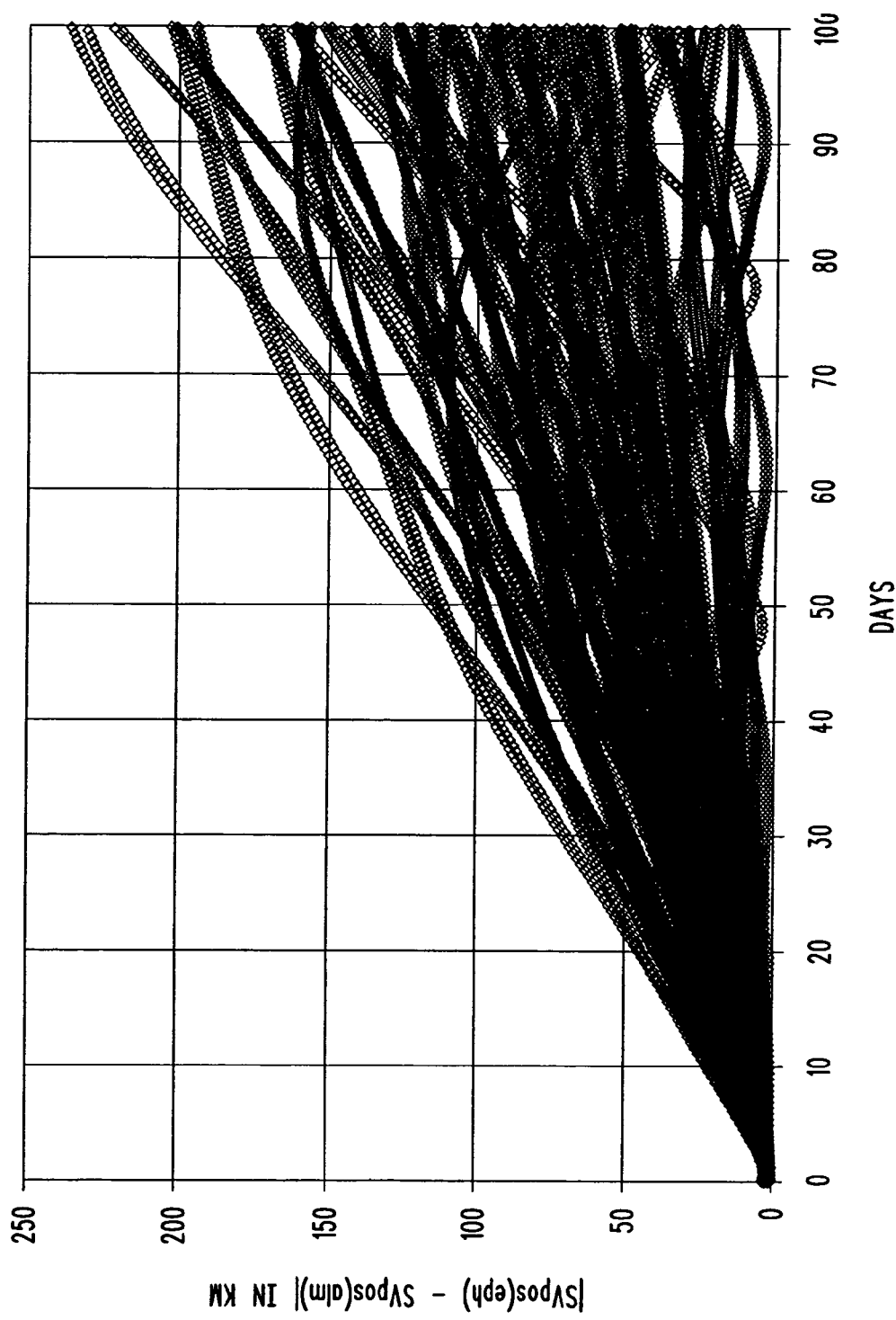
FIG. 8 is a plot of satellite position vector differences between almanac-derived satellite positions and ephemeris-derived satellite positions, as a function of almanac and ephemeris age.

FIG. 8 illustrates the growth of the difference in satellite position vectors described in Eqn. (5) as a function of the age of ephemeris and almanac data. The x-axis in FIG. 8 represents the age of the almanac/ephemeris in days, while the Y-axis represents the satellite position vector difference, i.e., Eqn. (5), for all satellites in the GPS constellation at a particular epoch time. At day number zero, a fresh almanac and ephemeris for the entire GPS constellation was collected. When the almanac and ephemeris are fresh (day number 0, 1, 2), the difference in satellite positions is relatively small, on the order of 1-2 km. As the data sets age, the difference in satellite position derived from ephemeris as compared to almanac grows to be no more than 300 km after about 100 days. Most of the difference is due to error growth in satellite positions from the ephemeris data, not from the almanac data, because of the inclusion of the amplitude of sin and cosine corrections to arguments of latitude, orbital radius and inclination angle. Compared to the user-to-satellite range, which is between 20,100 km and 28,500 km, a 300 km position error in the satellite position vector is very small compared to the geometry of the user to satellite range ($\frac{1}{67}^{th}$ to $\frac{1}{95}^{th}$ of the range vector). Thus, satellite visibility equations that describe the azimuth and elevation of a particular satellite as a function of time will be in error by no more than approximately 1-2 degrees.

Figure 9:
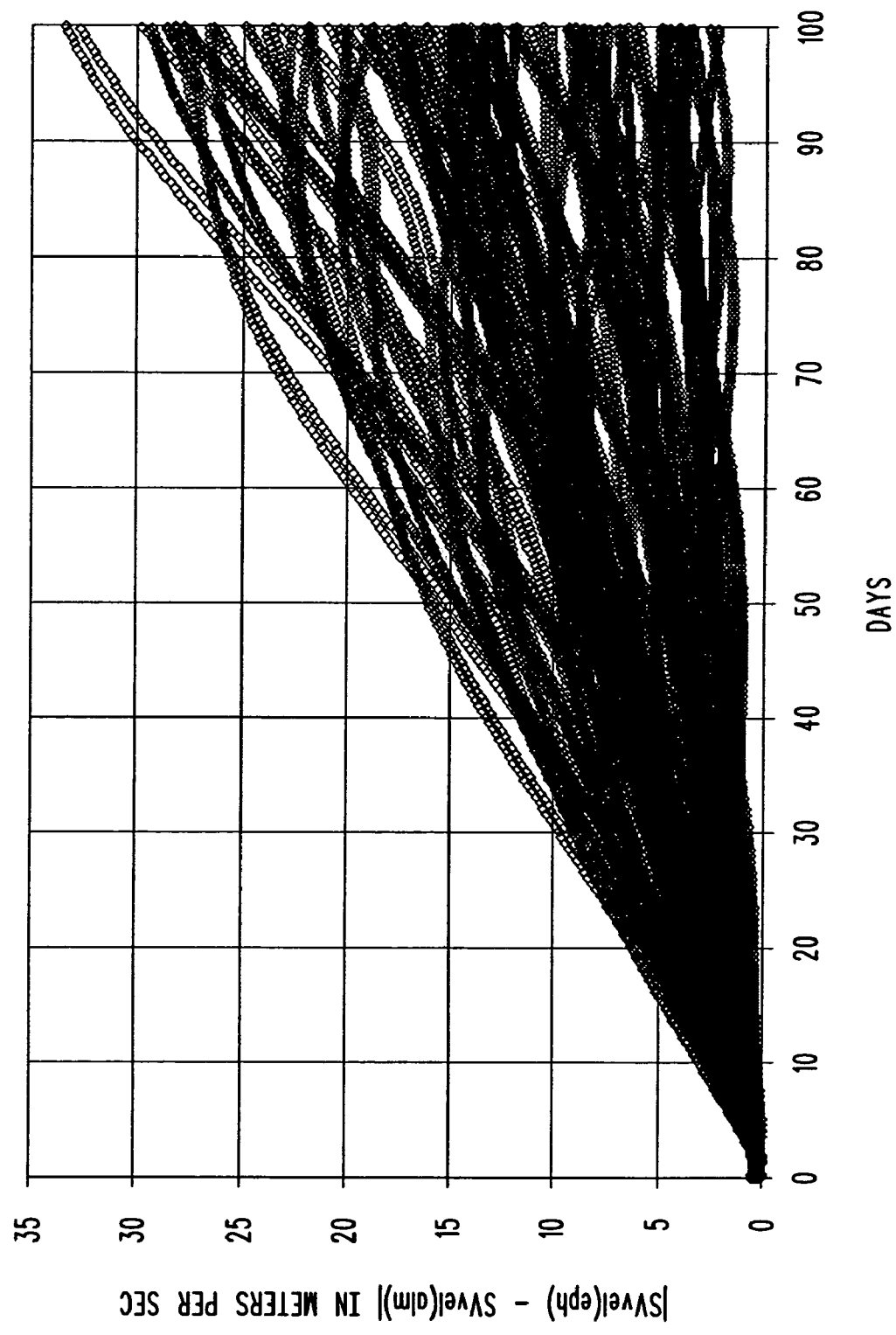
FIG. 9 is a plot of satellite velocity vector differences between almanac-derived satellite velocities and ephemeris-derived satellite velocities, as a function of almanac and ephemeris age.

FIG. 9 shows the satellite velocity vector difference between ephemeris and almanac data as both age from their "fresh" state (day=0, 1, 2) to the relatively old 100 days. Most of the satellite velocity vector difference is in the along-track direction, but it could be in the direction of the user-to-satellite unit vector which means it translates directly to predicted Doppler error. After about 100 days, the worst-case velocity vector difference is less than 35 meters per second, which translates to about 183 Hz predicted Doppler error if all the velocity error is in the direction of the user-to-satellite unit vector; a low probability case. Most of the difference shown in FIG. 9 is due to the aging ephemeris data, not the aging almanac data. The predicted Doppler with 100 day-old ephemeris data is sufficient to acquire satellites if the acquisition algorithm takes into account the nearly linear growth in Doppler uncertainty due to the aging ephemeris data. For example, the acquisition algorithm could modify the Doppler uncertainty as a function of approximately ephemeris age, for example, Du=183 Hz*Days/100, and expand the Doppler search space accordingly based on the age of the stored ephemeris data as it ages.

Figure 10:
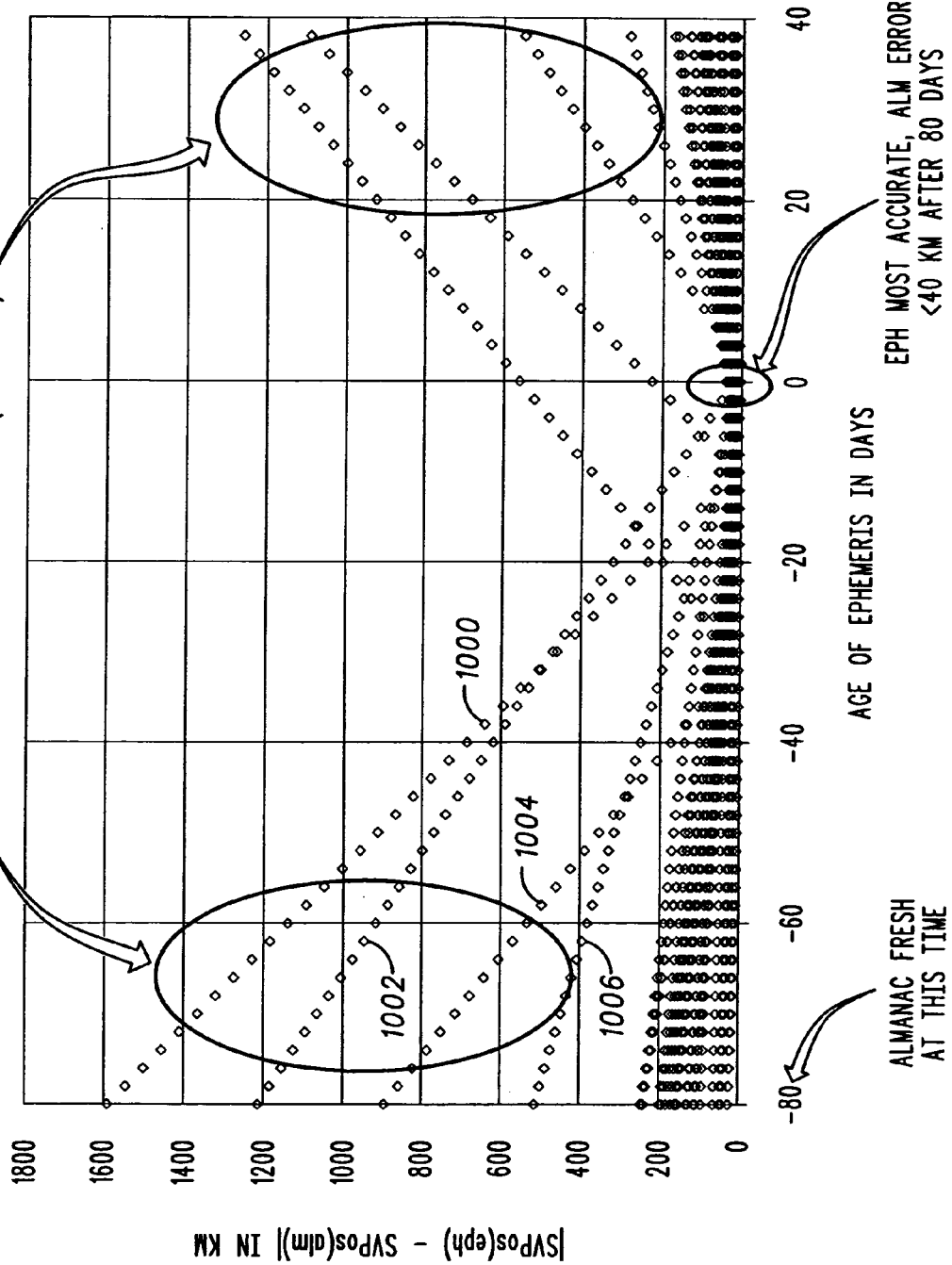
FIG. 10 is a plot of satellite position vector differences between almanac-derived satellite positions and ephemeris-derived satellite positions, for the case of fresh ephemeris and an almanac that is 40 days old, as a function of ephemeris age in days.
Figure 11:
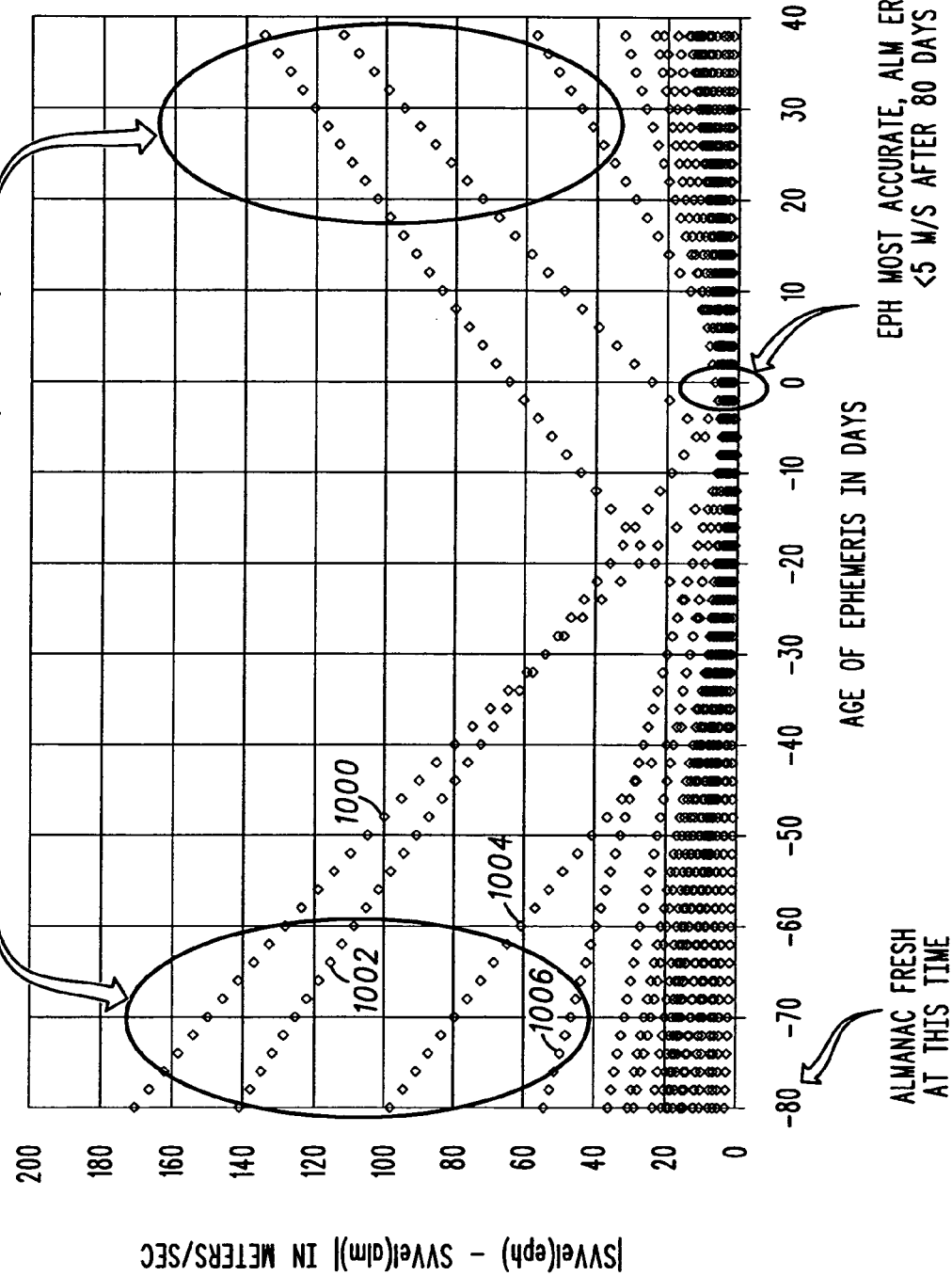
FIG. 11 is a plot of satellite velocity vector differences between almanac-derived satellite velocities and ephemeris-derived satellite velocities, for the case of fresh ephemeris and an almanac that is 40 days old, as a function of ephemeris age in days.

FIGS. 10 and 11 illustrate the satellite position and velocity difference relationship of a current ephemeris data (day=0) compared to almanac data that was current 80 days earlier. At t=−80 days, fresh almanac data is captured and stored in memory. At t=0 days, fresh ephemeris data is collected and compared to the older almanac data. After the ephemeris data is collected, one can plot the position/velocity difference backwards in time, i.e., from T=−80 days (almanac fresh, ephemeris −80 days old) to T=0 days (ephemeris fresh, almanac 80 days old). This allows a direct comparison of the performance of almanac data after 80 days of aging when the almanac positions and velocities are compared to ephemeris positions and velocities when time T is within the accurate ephemeris time period of −7200 seconds<=t-TOE<=+7200 seconds. At day zero (x-axis), ephemeris data is most accurate and the aging almanac is the source of most of the position/velocity difference. FIG. 10 indicates that even after 80 days of aging, almanac data still returns position data within 40 km, and velocity accuracy within about 5 meters per second (FIG. 11) of truth, truth data being determined from the fresh ephemeris data.

In FIGS. 10 and 11, plots 1000, 1002, 1004 & 1006 represent error versus time for a group of four satellites, whose position and velocity errors are substantially greater than the other 24 satellites in the constellation. Periodically, satellites in the GPS constellation are re-phased or moved in the orbit to re-align the orbit for more optimum coverage. As a result, in FIGS. 10 and 11, satellites corresponding to plots 1000, 1002, 1004 & 1006 have been re-phased in orbit some time in the 80 days between acquisition of the almanac and ephemeris data. Thus the old orbit was captured by the "old" almanac data, while the "new" orbit was captured by the "new" ephemeris data. Consequently, there is a substantially large position and velocity error in re-phased satellite position and velocity comparisons between almanac and ephemeris data. This error is detectable by much larger than normal error growth over time, and the fact that a particular satellite has been re-phased in orbit can also be detected by a much larger error than expected in the old almanac satellite position/velocity data compared to the newer ephemeris satellite position/velocity data. The almanac data that is stored should probably be replaced with fresh almanac, or simply use the newly gathered ephemeris data to acquire satellites. Attempts to use the old "pre-phasing" almanac or ephemeris data to acquire a satellite "post-rephasing" will likely result in failure to detect the satellite due to a large estimated Doppler error.

According to another aspect of the disclosure, an SPS receiver downloads ephemeris, during normal usage, via a cellular network over-the-air protocol message or directly from GPS satellites in order to compute accurate position solutions at the SPS receiver. When new ephemeris is obtained, the SPS receiver compares the accuracy of the previously stored almanac data to the fresh ephemeris data, and depending on an error threshold, decides whether to replace the satellite's almanac data with the ephemeris data or collect fresh almanac directly from satellites.

In some embodiments, the SPS receiver, which may be embedded in a communications device, stores both almanac and ephemeris data for each satellite and compares the accuracy of the stored almanac data with the stored fresher ephemeris data, and decides to use either the almanac data or the ephemeris data for each satellite acquisition assist computation dependent on the inaccuracy or error and/or age of almanac and ephemeris data. In another embodiment, the SPS receiver stores almanac and ephemeris data for each satellite in the constellation, and computes assist data from the most accurate or fresh source, either almanac or ephemeris data. A failure to detect a particular satellite using the assist data will trigger a request for fresh ephemeris for the non-acquired satellite from a wireless network. In another embodiment, the SPS receiver stores ephemeris data for generation of satellite acquisition assist at times outside the −7200 second<=t-TOE<=+7200 time period. When the expected error in the assist data is greater than a threshold, the wireless handset requests fresh ephemeris for the particular satellite. In still another embodiment, the SPS receiver stores ephemeris data for generation of satellite acquisition assist at times outside the −7200 second<=t-TOE<=+7200 time period. When the age of ephemeris exceeds a particular threshold after which the assist data becomes inaccurate, the GPS receiver embedded in the communications device requests fresh ephemeris for the particular satellite.

According to another aspect of the disclosure, a satellite positioning system receiver not attempting to acquire satellites, upon determining that ephemeris data for at least one satellite stored on the satellite positioning system receiver is no longer useful for generating satellite acquisition assistance data, the SPS receiver periodically updates ephemeris data, for example, from a communications network or directly from the satellites, while the satellite positioning system receiver is not attempting to acquire satellites until the satellite positioning system receiver has received updated ephemeris data for the at least one satellite. In one embodiment, ephemeris data is updated while the satellite positioning system receiver is not attempting to acquire satellites until the satellite positioning system receiver has received updated ephemeris data for all satellites.

According to another aspect of the disclosure, upon determining that ephemeris data stored on the satellite positioning system receiver is outdated, a satellite positioning system receiver determines that a particular satellite is visible using the outdated ephemeris data while not attempting to acquire satellites with the satellite positioning system receiver, and requests current ephemeris data for the same satellite with a over-the-air message while not attempting to acquire satellites with the satellite positioning system receiver. According to another aspect of the disclosure, a satellite positioning system receiver determines that ephemeris data is too inaccurate to acquire a satellite by attempting to acquire the satellite using the stored ephemeris data. If the ephemeris data is inaccurate, accurate ephemeris is requested in an over-the-air message.

According to another aspect of the disclosure, low-resolution satellite orbital information is generated from information obtained from at least one issue of ephemeris data. In some embodiments, the low-resolution satellite orbital information derived from information obtained from the at least one ephemeris issue has a resolution level sufficient for computing satellite location and velocity information. Satellite position and velocity information may be used to determine satellite Doppler estimates and uncertainty ranges, which may be useful for initial satellite acquisition by SPS receivers. In other embodiments, the low-resolution satellite orbital information derived from the at least one issue of ephemeris data is substantially the same as almanac data. Thus the low-resolution satellite orbital information is useful for SPS receivers not having previously stored almanac data, and in receivers where previously stored almanac data becomes lost, corrupted, or outdated. This process may also eliminate the need to obtain almanac data directly from the satellites or from an over-the-air message. In some SPS receivers it is impractical for receiver manufacturers to store almanac data or to store timely almanac data on the receiver. In these and other instances it is desirable to generate low-resolution satellite orbital information on SPS receivers.

Generally, a good approximation can be made to the almanac parameters from an ephemeris data set, at least for satellite acquisition purposes, by using the ephemeris data without regard to the amplitude of sin and cosine corrections to arguments of latitude, orbital radius, and inclination angle and limiting the orbit computation to the following original ephemeris parameters:

$M_0$—Mean Anomaly at Reference Time;
e—Eccentricity;
$(A)^{1/2}$—Square Root of the Semi-Major Axis;
$(OMEGA)_0$—Longitude of Ascending Node;
$i_0$—Inclination Angle at Reference Time;
ω—Argument of Perigee;
OMEGADOT—Rate of Right Ascension; and
IDOT—Rate of Inclination Angle.

It is generally acceptable to use ephemeris data for satellite acquisition purposes during periods of time substantially outside the +/−2-hour interval, for example, 100 or more days.

Figure 6:
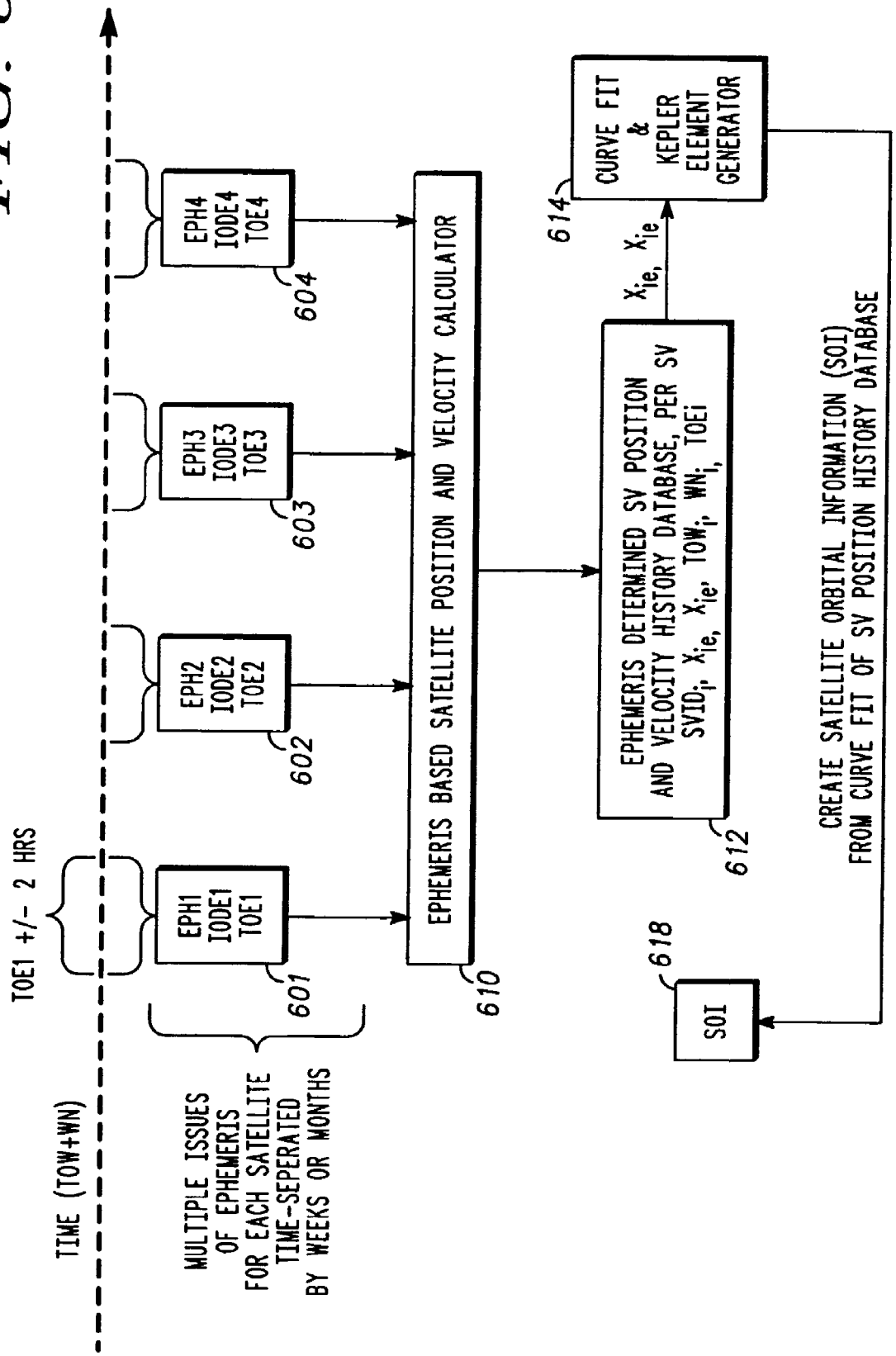
FIG. 6 is schematic illustration of a process for deriving satellite orbital information from ephemeris information.

FIG. 6 illustrates a process for generating relatively low-resolution satellite orbital information from at least one issue of ephemeris data from the same satellite. The SPS receiver obtains multiple issues of ephemeris data EPH1 601, EPH2 602, EPH3 603 and EPH4 604, etc., from the same satellite from time to time, for example, in connection with SPS receiver position solutions. The ephemeris data may be acquired directly from SPS satellites or it may be requested from some other source, for example, from an assisted base-station via an over-the-air message. The interval between sequential issues of ephemeris data may be weeks or months, depending upon the resolution required of the low-resolution satellite orbital information derived therefrom, although longer or shorter time intervals may be used alternatively. The intervals between ephemeris data issues preferably exceed the valid time period of any particular ephemeris issue, e.g., TOE+/−2 hours.

The multiple issues of ephemeris data are obtained during the normal course of SPS receiver operation, for example, when required for determining a position or location fix of the receiver. Thus, generally, it is unnecessary to allocate SPS receiver resources specifically to obtaining ephemeris data for the sole purpose of generating low-resolution satellite orbital information, since the ephemeris information is generally acquired for other purposes. In some instances, however, it may be desirable to obtain ephemeris data specifically for use in generating or updating the resolution of the low-resolution satellite orbital information, for example, to ensure that the derived low-resolution satellite orbital information has the desired resolution.

In FIG. 6, ephemeris based satellite position and velocity is calculated at block 610. The satellite position vectors (SVPosXYZ_eph[sv]) and satellite velocity vectors (SVVelXYZ_eph[sv]) are artifacts of SPS position determinations at particular time epoch based on the corresponding ephemeris data. Preferably, for each ephemeris data set, at least one satellite position and velocity vector coordinate pair is stored in a database on the SPS receiver, as indicated at block 612. More particularly, the parameters stored include the satellite position vector SVPosXYZ_eph[i], satellite velocity vector SVVelXYZ_eph[i], satellite identification (SVID[i]), the time associated with the satellite position/velocity data (TOW[i]), the GPS week number (Wn[i]), and optionally the time of ephemeris (TOE[i]). The index [i] indicates the entry number in the database for the particular parameter, example; svid[i] the corresponding satellite ID for that entry. The TOE[i] may be stored instead of TOW provided that satellite position and velocity are computed at TOE time instead of TOW time. It is not likely that the normal position computation function would actually compute time at exactly TOE time, so it is more practical to store TOW time associated with the time of computation of the satellite position/velocity data. In applications in which no additional calls of the ephemeris based satellite position and velocity function are used, the storage of TOE can be avoided. The storage of TOW[i] may be avoided if additional calls of the ephemeris based satellite position and velocity function can be tolerated, then it is easier to compute the position and velocity coordinates at TOE time, which allows for simplification of the database because TOW time would be stored as TOE time, which requires fewer bits since it is an integer representation. If the SPS receiver is used daily, the logic has the luxury to store data at some periodic rate, for example, weekly. If the usage pattern is much more sparse, say once per year, then every ephemeris data set acquired would be used to update the stored almanac parameters.

In FIG. 6, at block 614, the satellite orbital information is obtained by a direct curve-fit function that forms a satellite position curve and satellite velocity curve from the plurality of satellite position vectors and velocity vectors as a function of time. Computation of the Keplerian orbit elements may be determined in the traditional way. An example of computing Keplerian orbital elements from satellite position and velocity data points is discussed starting on page 61 in "Fundamentals of Astrodynamics", by Bate, Mueller, and White, published by Dover Publications, 1971. The satellite orbital information is stored at block 618 and is used later for acquisition assist generation.

In some embodiments, portions of the corresponding plurality of issues of ephemeris data received for the at least one satellite, for example, eliminating sine and cosine harmonic terms in order to remove this long-term error source in the ephemeris orbit equations. This can be accomplished by setting the amplitude of sin and cosine corrections to arguments of latitude, orbital radius, and inclination angle to zero In some embodiments, the satellite orbital coefficients determined at block 614 are converted to almanac data resolution and format for convenience. It is not necessary to scale the determined satellite orbital coefficients into the same number of bits and scale factor transmitted by GPS satellites. Scaling allows almanac data obtained directly from GPS satellites or the satellite orbital coefficients to be stored in the same holding register by converting the satellite orbital coefficients into the format and resolution of almanac data. Also, the precision of the plurality of issues of ephemeris data may be reduced to a resolution level comparable with almanac data for the same satellite as described in U.S. Pat. No. 6,437,735.

According to another aspect of the disclosure, almanac data stored on the SPS receiver is updated occasionally based upon differences in ephemeris-based satellite position and velocity information and almanac-based satellite position and velocity information. This strategy eliminates the necessity of downloading updated versions of almanac data.

The almanac data may be initially stored in memory on the SPS receiver during manufacture, for example, via a serial port connection prior to shipping from the factory. Alternately, almanac data could be installed in the SPS receiver when it is initially delivered to the user, for example, upon activation of a SPS enabled cellular telephone. The almanac data may also be obtained directly from SPS satellites, for example, using the synchronization scheme discussed above, or by conventional means requiring at least 12.5 minutes of continuous satellite tracking, which can substantially drain the handset battery if not coupled to an external power source. According to this aspect of the disclosure, however, it is only be necessary to obtain the almanac data once, regardless of the acquisition means.

This scheme takes advantage of the fact that the SPS receiver occasionally acquires fresh ephemeris data for receiver position computations. The ephemeris data may be acquired directly from SPS satellites in about 30 seconds of continuous tracking, or it can be requested via an over-the-air message set from an assisted SPS base station or from some other source.

Figure 7:
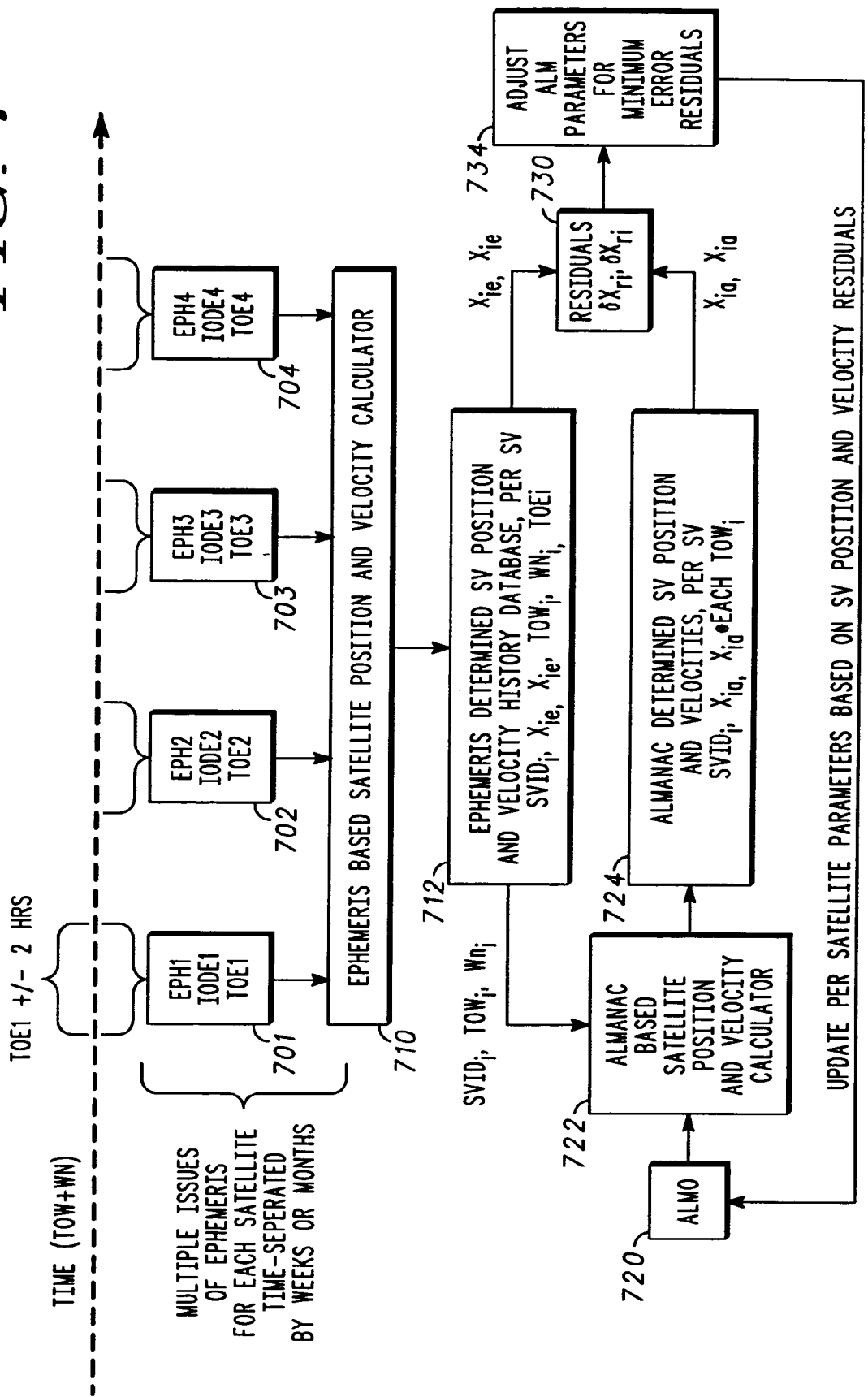
FIG. 7 is a schematic illustration of a process for updating almanac information with ephemeris information.

In FIG. 7, the SPS receiver obtains multiple issues of ephemeris data EPH1 701, EPH2 702, EPH3 703 and EPH4 704, etc., from the same satellite from time to time, for example, in connection with SPS receiver position solutions, separated by some time interval as discussed above in connection with FIG. 6. As discussed, an artifact of position computations is satellite position vector (SVPosXYZ_eph[i]) and satellite velocity vector (SVVelXYZ_eph[i]) information for each satellite at a particular time epoch based on the fresh ephemeris data. In FIG. 7, satellite position vector SVPosXYZ_eph[i], satellite velocity vector SVVelXYZ_eph[i], satellite identification (SVID), time associated with the satellite position/velocity data (TOW[i]), GPS week number (Wn[i]), and optionally the time of ephemeris (TOE[i]) are stored at block 712, as discussed above in relative to FIG. 6.

The ephemeris data creates relatively true satellite position and velocity vectors during a portion of time bracketing the time of ephemeris (TOE) by two hours, i.e., TOE+/−2 hours. Thus any satellite position/velocity data derived from fresh ephemeris data at a time epoch between or within the range of TOE+/−2 hours can be used as a "truth model" when compared to almanac-derived satellite position and velocity vector data for the same time epoch. As the stored almanac data ages, the error between the ephemeris and almanac derived position and velocity vectors grows to some unacceptable limit. The differences, also referred to as position and velocity residuals, can be used to compute adjustments to the originally stored almanac parameters to reduce the almanac produced errors.

The process generally compares almanac derived satellite position and velocity information to satellite position and velocity information derived from current ephemeris data, and derives corrections for current almanac parameters based upon the comparison. The corrections are used to update the almanac parameters (new_param=old_param+correction), for which the new parameters are stored for future acquisitions, for example, acquisitions outside the window of applicability of the current ephemeris data.

Upon development of a database of several current and past satellite position coordinates for several satellites, almanac data error may be measured. In FIG. 7, the almanac data stored at block 720 and the SVID[i], TOW[i], and Wn[i] parameters stored at block 712 are used to compute almanac-based satellite position SVPosXYZ_alm[i] and velocity SVVelXYZ_alm[i] coordinates using an almanac-based satellite position and velocity calculator 722. The almanac position and velocity information is computed at the time indicated by TOW[i] for each satellite (SVID[i]), which is obtained from block 712. The almanac-based computation results are stored at block 724.

In FIG. 7, at block 730, differences in satellite position and in satellite velocity vectors are computed. Specifically, $\Delta PXYZ[i]=SVPOS\_eph(t, wk, sv)-SVPOS\_alm(t, wk, sv)$ represents the 3 dimensional difference vector in position based on current satellite ephemeris and the aging almanac position, and $\Delta VXYZ[i]=SVVeleph(t, wk, sv)-SVVel\_alm(t, wk, sv)$ represents the 3-dimensional difference in velocity based on current satellite ephemeris and the aging almanac velocity. The residuals are computed and stored in a database for each satellite stored in database at steps 712 and 724.

The position and velocity residual information may be used as an error signal, which may be used to correct the aging almanac data. In FIG. 7, at block 734, parameters of the original almanac are adjusted by a function based on the size of the residuals over the time interval corresponding to the samples in the truth model database. After each adjustment of the almanac orbit parameters, the process can repeat, creating a new set of residuals for each satellite.

In one embodiment, the process uses Least-Squares (LS) computations, or it may be performed iteratively to minimize the number of iterations. If a LS computation approach is used, the problem is best solved through computations and partial derivatives of the satellite and position error vectors with respect to the orbital parameters, i.e., modeling first order, underlying sensitivities involved. It can also be performed by testing sensitivities of each almanac parameter and by adjusting each one dependent on the direction of the dominant error in the residuals.

For example, if most of the error is in the along-track direction, then the mean-motion parameter should be adjusted to minimize the along track error on subsequent iterations. The essentially linear error growth in along-track position error can be attributed largely to a misrepresentation of a single orbital element, namely, the mean motion of the satellite. This parameter represents the linear angular rate of growth of the projected path of the satellite in a circle which circumscribes the ellipse (along which its actual motion occurs) and is related to two parameters within the ephemeris, the semi-major axis, a, and the correction to mean motion, $\Delta n$, both appearing in the Equations below:

$$M = n(t - t_p) \quad (6)$$

$$n = \mu/a^3 + \Delta n \quad (7)$$

where "t" denotes time, "tp" denotes the time of perigee passage, "n" is the mean motion, and "M" is the angle within the circumscribing circle, and where "$\mu$" represents a gravitational constant.

Given a measurement of the along-track error component of the almanac by comparison with a current ephemeris, a correction can be generated by making an adjustment to the mean motion parameter assumed by the almanac, thereby reducing its dominant error component. Other parameters can be also adjusted depending on the direction and size of the residual error vectors.

As the process continues to refresh the stored almanac data, the older ephemeris based data stored in memory are replaced with newer position and velocity information so that the process of measuring errors are based mostly on newer ephemeris data collected in the future relative to the date of the almanac data. The process thus measures the error growth of the stored almanac as it ages compared to the truth ephemeris. Some minimum number of stored data points per satellite needs to be collected in memory.

In some instances, it may not be possible to update the almanac data, for example, in cases where the residuals are not sufficiently reduced by iteration. In these instances is may be necessary to acquire new almanac data or to generate low-resolution satellite information from ephemeris data as discussed above.

Situations that may result in convergence of the residuals include Department of Defense (DoD) satellite orbit changes (i.e., orbit re-phasing) within the time frame of the satellite position and velocity history data stored in database, for example, between the time of EPH2 and EPH3. Since the time frame between the collection of EPH2 and EPH3 position and velocity information may be relatively long, weeks or months, there is no sure way to know whether a satellite has been re-orbited. In one embodiment, ephemeris data parameters that indicate whether a satellite trajectory has been changed are stored. Examples of parameters that may be stored to detect significant changes in satellite orbits, such as may occur during the re-orbiting of a spacecraft, include any one or more of the following ephemeris parameters, among others, for detecting significant changes in satellite orbit:

$M_0$—Mean Anomaly at Reference Time;
e—Eccentricity;
$(A)^{1/2}$—Square Root of the Semi-Major Axis;
$(OMEGA)_0$—Longitude of Ascending Node;
$i_0$—Inclination Angle at Reference Time;
$\omega$—Argument of Perigee;
OMEGADOT—Rate of Right Ascension; and
IDOT—Rate of Inclination Angle.

For each of these parameters, an expected guard band would be created, basically a minimum and a maximum value that would bracket the expected next value of the parameter given that no re-orbit event occurred. When a next ephemeris data set is acquired, for example, from the cellular network, each new parameter would be tested against its expected guard-banded range based on the previous history of ephemeris data. If any of the above parameters exceeded its expected maximum or minimum value, then it's likely that a re-orbit operation occurred since the last ephemeris set was observed for this particular satellite. Under these circumstances, it would be necessary to replace any stored satellite position and velocity data derived from the ephemeris data from the re-orbited satellite.

A particular handset must be used periodically for position fixing in order for the handset to obtain current copies of all ephemeris data for acquired or visible satellites in order to compute an accurate position solution internally. Thus, depending on the usage pattern of a particular handset, it may be used frequently enough to update the stored almanac or low-resolution satellite orbit parameters, or it may be used so infrequently that the almanac or low-resolution satellite orbit parameters get stale. Some method of updating the almanac data or low-resolution satellite orbit parameters in low usage pattern handsets is required.

The satellites in the GPS constellation are in an approximately 12-hour periodic orbit that precesses about 4 minutes per day. This means that the same satellite appears at the same point of the sky 23 hours and 56 minutes later (not 24 hours). Each satellite in the constellation rises and sets during different parts of the day. A handset that is used one time per week, say at 8 AM local time, will obtain fresh ephemeris for the satellites visible at that time, but not obtain ephemeris for other satellites in the constellation. This is because the over-the-air protocol messages in cellular AGPS assist transport fresh ephemeris data to the handset only for the satellites that are currently visible at the user's approximate location. Since the constellation of visible satellites is not much different at 8 AM between adjacent weeks, the handset will only obtain fresh ephemeris for the same satellites over and over again until the constellation slowly rotates relative to the user's local clock. Consequently, it can take many months for other satellites in the constellation to become visible to the handset because they are not visible to the handset at 8 AM local time, and will not be visible at that time for many months. Consequently, it is possible for the method disclosed herein to update a certain number of satellites frequently, and not update other satellites for a long time because the satellites not updated are on a different visibility schedule relative to the user's usage pattern.

One method to counter this aging rate difference is to program the handset to recognize when certain satellites stored almanac or low resolution satellite orbit parameters are getting old or stale, either because the handset is not being used for periodic position computations, or because the usage pattern for position computation is such that certain satellites are never updated. The handset can be programmed to determine when the satellites needing update are visible, by normal computation of satellite visibility using the aging almanac or low-resolution satellite orbit parameters. In one embodiment, the handset would not attempt to acquire the satellite, only recognize that the satellite with the aging almanac or low resolution satellite orbit parameters is presently visible using local time from a real-time clock or cellular over-the-air message, the handset's last known location or a cellular over-the-air message intended for transporting approximate position to the handset, and the aging almanac or low resolution satellite orbit parameters. Using this data, the handset can then know when the satellite for which the almanac or low resolution satellite orbit parameters are in need of update, and then request an ephemeris update for all satellites visible at that time. The handset would not necessarily have to compute position, but still it can go through the over-the-air protocol exchange as if it was attempting a position fix. When the cellular network receives the request for fresh ephemeris data, all ephemeris data for satellites visible at that time, including the satellite needing an update to its stored almanac or low-resolution satellite orbit parameters, would be transported to the handset. The handset could proceed to a position fix, or simply use the algorithms described in this disclosure to update the stored almanac or low-resolution satellite orbit parameters to be used for satellite acquisition assist if and when the handset or user needs to acquire satellites and produce a position fix. This update procedure would be accomplished without ever turning on the handset's internal GPS receiver, the update process could be scheduled at times of the day when little cellular over-the-air traffic was occurring (for example, 2 am), so that fresh almanac or low resolution satellite orbit parameters are always available for every satellite in the constellation.

While the present disclosure and what are considered presently to be the best modes of the inventions have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a satellite positioning system receiver, the method comprising:

operating a receive function of the receiver synchronously with an expected time of arrival of subframe information from at least one satellite of a satellite positioning system, the receive function of the receiver enabled during an expected time of arrival of a subframe having information for which reception is desired, the receive function of the receiver disabled during an expected time of arrival of a subframe having information for which reception is not desired;

receiving the subframe information from the at least one satellite when the receive function is enabled.

2. The method of claim 1, enabling the receive function during an expected time of arrival of a frame containing satellite orbital information from at least one satellite of a satellite positioning system.

3. The method of claim 2, disabling the receive function during an expected time of arrival of a frame not containing satellite orbital information.

4. The method of claim 1, enabling the receive function during an expected time of arrival of a frame containing information from the group comprising clock correction information, ionospheric correction information, tropospheric correction information, universal time coordinate offset correction information.

5. The method of claim 4, disabling the receive function during an expected time of arrival of a frame not containing information from the group comprising clock correction information, ionospheric correction information, tropospheric correction information, universal time coordinate offset correction information.

6. The method of claim 1, receiving navigation information when the receive function is enabled while acquiring a satellite of the satellite positioning system.

7. The method of claim 1, receiving navigation information when the receive function is enabled while tracking a satellite of the satellite positioning system.

* * * * *